(12) United States Patent　　　　　(10) Patent No.:　US 12,689,988 B2

Hong　　　　　　　　　　　　　　　　　(45) Date of Patent:　　Jul. 21, 2026

(54) METHODS OF CONTROLLING CHARGING FOR USER EQUIPMENT, AND COMMUNICATION DEVICE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 315 days.

(21) Appl. No.: 18/288,802

(22) PCT Filed: Apr. 27, 2021

(86) PCT No.: PCT/CN2021/090207

§ 371 (c)(1),
(2) Date: Oct. 27, 2023

(87) PCT Pub. No.: WO2022/226773

PCT Pub. Date: Nov. 3, 2022

(65) Prior Publication Data

US 2024/0224191 A1　　　Jul. 4, 2024

(51) Int. Cl.
*H04W 52/02*　　　　(2009.01)
*H02J 50/80*　　　　(2016.01)
(Continued)

(52) U.S. Cl.
CPC ......... *H04W 52/0296* (2013.01); *H02J 50/80* (2016.02); *H04W 36/0058* (2018.08); *H04W 36/0079* (2018.08); *H04W 36/008357* (2023.05); *H04W 36/08* (2013.01); *H04W 92/20* (2013.01)

(58) Field of Classification Search
CPC ......... H04W 52/0296; H04W 36/0058; H04W 36/0079; H04W 36/008357; H04W 36/08; H04W 92/20; H04W 52/00; H02J 50/80
See application file for complete search history.

(56) References Cited

U.S. PATENT DOCUMENTS 10,790,692 B2　　9/2020　Ahmed et al.
11,711,799 B2 *　7/2023　Shrader ................. H04W 76/14
370/329
(Continued)

FOREIGN PATENT DOCUMENTS

CN　　　103167588 A　　6/2013
CN　　　105006894 A　　10/2015
(Continued)

OTHER PUBLICATIONS

The First CNOA issued in Application No. 2021800011023 dated Mar. 20, 2024 with English translation, (14p).
(Continued)

*Primary Examiner* — Charles T Shedrick
(74) *Attorney, Agent, or Firm* — Arch & Lake LLP; Hao Tan; Shen Wang

(57)　　　　　　ABSTRACT

Provided are methods of controlling charging for a user equipment (UE), and a communication device. One of the methods includes: in response to a measurement report of a UE, a source base station determining a target base station for the UE; and sending wireless charging information of the UE to the target base station.

14 Claims, 4 Drawing Sheets

In response to a measurement report of the UE, determine a target base station of the UE　～ 101

Send wireless charging information of the UE to the target base station　～ 102

(51) Int. Cl.

| | | |
|---|---|---|
| *H04W 36/00* | (2009.01) |
| *H04W 36/08* | (2009.01) |
| *H04W 92/20* | (2009.01) |

(56) References Cited

U.S. PATENT DOCUMENTS

| | | | | |
|---|---|---|---|---|
| 2016/0285299 A1* | 9/2016 | Amand | .................... | H04B 7/26 |
| 2016/0380464 A1* | 12/2016 | Chin | ........................ | H02J 50/80 |
| | | | | 320/108 |
| 2017/0317520 A1* | 11/2017 | Maguire | ................... | H02J 7/42 |
| 2018/0091002 A1* | 3/2018 | Park | ........................ | H02J 50/20 |
| 2018/0145544 A1* | 5/2018 | Park | ........................ | H02J 50/10 |
| 2019/0068005 A1* | 2/2019 | Wang | ..................... | H02J 50/10 |
| 2019/0105994 A1 | 4/2019 | Ahmed et al. | | |
| 2019/0305567 A1* | 10/2019 | Keeley | ................... | H01F 38/14 |
| 2019/0363843 A1* | 11/2019 | Gordaychik | .......... | H04L 1/1896 |
| 2020/0266670 A1* | 8/2020 | Ha | ............................ | H02J 7/90 |
| 2021/0167638 A1* | 6/2021 | Yahagi | ................. | H02J 50/402 |

FOREIGN PATENT DOCUMENTS

| | | | | | | |
|---|---|---|---|---|---|---|
| CN | 105493529 | A | * | 4/2016 | .............. | H04W 4/02 |
| CN | 206171221 | U | * | 5/2017 | | |
| CN | 109624734 | A | | 4/2019 | | |
| EP | 0408061 | A2 | * | 1/1991 | ......... | H04L 49/3009 |
| WO | 2020043034 | A1 | | 3/2020 | | |

OTHER PUBLICATIONS

Written Opinion of International Searching Authority issued in Application No. PCT/CN2021/090207 dated Jan. 19, 2022 with English translation, (9p).

ISA State Intellectual Property Office of the People's Republic of China, International Search Report Issued in Application No. PCT/CN2021/090207, dated Jan. 19, 2022, with English translation,(4p).

\* cited by examiner

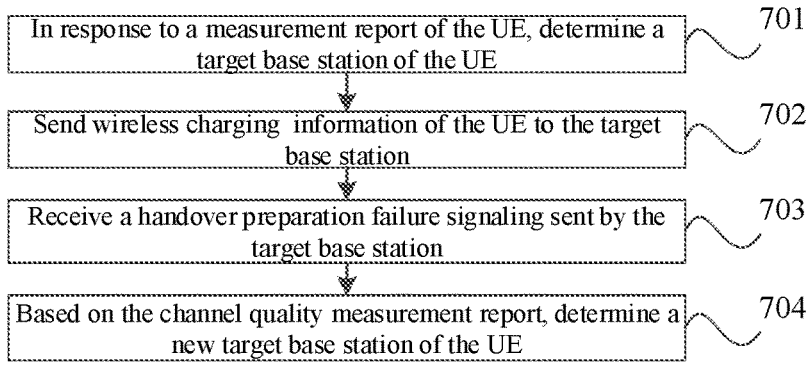

In response to a measurement report of the UE, determine a target base station of the UE — 701

Send wireless charging information of the UE to the target base station — 702

Receive a handover preparation failure signaling sent by the target base station — 703

Based on the channel quality measurement report, determine a new target base station of the UE — 704

FIG.8

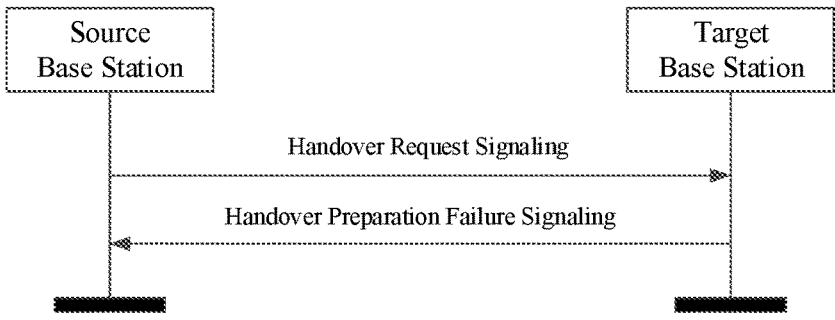

Source Base Station

Target Base Station

Handover Request Signaling

Handover Preparation Failure Signaling

FIG.9

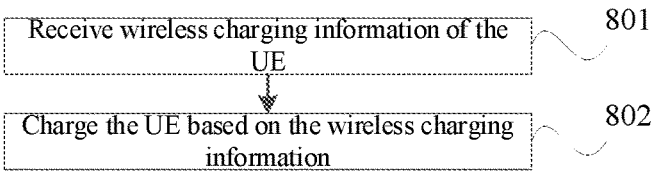

Receive wireless charging information of the UE — 801

Charge the UE based on the wireless charging information — 802

FIG.10

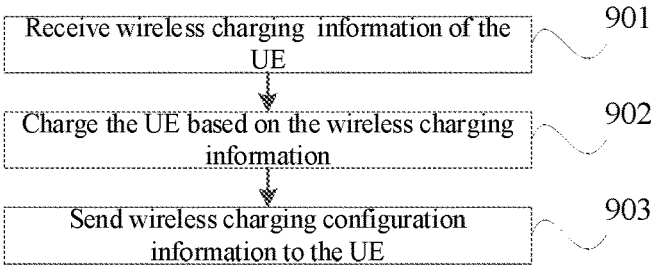

Receive wireless charging information of the UE — 901

Charge the UE based on the wireless charging information — 902

Send wireless charging configuration information to the UE — 903

METHODS OF CONTROLLING CHARGING FOR USER EQUIPMENT, AND COMMUNICATION DEVICE

CROSS REFERENCE TO RELATED APPLICATIONS

This application is a U.S. national phase application of International Application No. PCT/CN2021/090207, filed on Apr. 27, 2021, the disclosure of which is incorporated herein by reference in its entirety for all purposes.

TECHNICAL FIELD

The present disclosure relates to the field of wireless communication technologies and in particular to methods of controlling charging of a User Equipment (UE) and a communication device.

BACKGROUND

Wireless charging technologies mainly include three major categories which are an electromagnetic induction technology, an electromagnetic resonance technology and a radio frequency technology. The radio frequency technology includes an air charging technology in which a spatial electric field is used as a medium of energy transmission, for example, energy may be transmitted to a User Equipment (UE) in the form of extremely narrow beams of millimeter wave by a large number of antennas and the UE receives the energy through micro-beacon antennas, so as to achieve long-distance wireless charging.

SUMMARY

According to a first aspect of embodiments of the present disclosure, there is provided a method of controlling charging of a User Equipment (UE), which is performed by a source base station and comprises: in response to a measurement report of the UE, determining a target base station of the UE; sending wireless charging information of the UE to the target base station.

According to a second aspect of embodiments of the present disclosure, there is provided another method of controlling charging of a UE, which is performed by a target base station and includes: receiving wireless charging information of the UE; based on the wireless charging information, charging the UE.

According to a third aspect of embodiments of the present disclosure, there is provided a communication device, including a transceiver, a memory and a processor which is connected to the transceiver and the memory, respectively, and configured to execute computer executable instructions in the memory to control wireless signal reception and transmission of the transceiver, so as to perform the method of controlling charging of the UE mentioned in the first aspect of embodiments of the present disclosure, or the method of controlling charging of the UE mentioned in the second aspect of embodiments of the present disclosure.

Additional aspects and advantages of the present disclosure will be partially given in the following descriptions and will partially become apparent from the following descriptions or will be understood through the practice of the present disclosure.

BRIEF DESCRIPTION OF DRAWINGS

The above and/or additional aspects and advantages of the present disclosure will become apparent and easily being understood from the following descriptions of the embodiments in combination with accompanying drawings.

FIG. 8 is a flowchart illustrating another method of controlling charging of a UE according to one or more embodiments of the present disclosure.

FIG. 9 is a schematic diagram 2 illustrating interaction flow between a source base station and a target base station according to one or more embodiments of the present disclosure.

FIG. 10 is a schematic flowchart illustrating another method of controlling charging of a UE according to one or more embodiments of the present disclosure.

FIG. 11 is a schematic flowchart illustrating another method of controlling charging of a UE according to one or more embodiments of the present disclosure.

DETAILED DESCRIPTION

Figure 1:
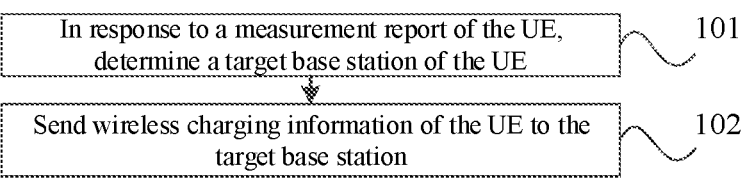
FIG. 1 is a flowchart illustrating a method of controlling charging of a UE according to one or more embodiments of the present disclosure.

Exemplary embodiments will be described in detail herein, with the illustrations thereof represented in the drawings. When the following descriptions involve the drawings, same numerals in different drawings refer to same or similar elements unless otherwise indicated. The embodiments described in the following examples do not represent all embodiments consistent with the examples of the present disclosure. Rather, they are merely examples of apparatuses and methods consistent with some aspects of the present disclosure as detailed in the appended claims.

The terms used in the embodiments of the present disclosure are for the purpose of describing particular examples only, and are not intended to limit the present disclosure. Terms determined by "a", "the" and "said" in their singular forms in the embodiments of the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although the terms "first," "second," "third," and the like may be used in the embodiments of the present disclosure to describe various information, such information should not be limited to these terms. These terms are only used to distinguish one category of information from another. For example, without departing from the scope of the embodiments of the present disclosure, first information may be referred as second information; and similarly, the second information may also be referred as the first information. Depending on the context, the term "if" as used herein may be interpreted as "when" or "upon" or "in response to determining".

The embodiments of the present disclosure will be described below in details with the examples thereof shown in the accompanying drawings, and the same or similar reference numerals represent same or similar elements throughout the specification. Furthermore, the embodiments described below by referring to the accompanying drawings are merely illustrative to explain the present disclosure rather than limit the present disclosure.

Along with the development of the cellular mobile communication technology, and especially the development of millimeter wave communication technology, more and more antennas can be disposed on a base station, for example, Massive Multiple Input Multiple Output (MIMO) is one of the key technologies of 5G.

At present, a base station can transmit energy to a UE in the form of extremely narrow beams of millimeter wave by using a large number of antennas, and the UE receives the energy through micro-beacon antennas, so as to achieve long-distance wireless charging.

However, when a UE being using a network service or being charged wirelessly moves from one base station to another, it is required to address the problem of wireless charging of the UE while the UE is switching between base stations.

For the above problem, the present disclosure provides methods and apparatuses of controlling charging of a UE and a communication device.

FIG. 1 is a flowchart illustrating a method of controlling charging of a UE according to one or more embodiments of the present disclosure. The method of controlling charging of the UE may be performed by a source base station.

The source base station refers to a base station performing data transmission with the UE prior to switching.

The base station may include multiple cells providing services for the UE. Based on specific different application scenarios, each cell may further include multiple Transmission Reception Points or Transmit Receive Points (TRPs) or may be a device communicating with a wireless terminal device via one or more sectors on an air interface in an access network, or another name. For example, the base station involved in the embodiments of the present disclosure may be Base Transceiver Station (BTS) in Global System for Mobile communications (GSM) or Code Division Multiple Access (CDMA), or a base station (NodeB) in Wide-band Code Division Multiple Access (WCDMA), or an evolutional Node B (eNB or e-NodeB for short) in a long term evolution (LTE) system, a 5G base station in a 5G network architecture (a next generation system) (gNB for short), or may be a Home evolved Node B (HeNB), relay node, femto, pico or the like, which is not limited herein.

The UE may refer to a device providing voice and/or data connectivity to a user, or a palm-held device with wireless connection function, or another processing device connected to a wireless modem or the like. In different systems, the name of the UE may be different. The wireless UE may communicate with one or more Core Networks (CNs) through a Radio Access Network (RAN). The wireless UE may be a mobile terminal device such as mobile phone (called cellular phone) and a computer with a mobile terminal device, for example, may be portable, pocket-sized, palm-held, and computer-inbuilt or vehicle-mounted mobile apparatus, which can exchange language and/or data with the radio access network.

For example, the UE may be Personal Communication Service (PCS) phone, cordless phone, Session Initiated Protocol (SIP) phone, Wireless Local Loop (WLL) station, Personal Digital Assistant (PDA) and the like. The wireless UE may also be referred to as system, subscriber unit, subscriber station, mobile station, mobile, remote station, access point, remote terminal, access terminal, user terminal, user agent and user device, which is not limited in the embodiments of the present disclosure.

As shown in FIG. 1, the method of controlling charging of the UE may include the following steps.

At step 101, in response to a measurement report of the UE, a target base station of the UE is determined.

In one or more embodiments of the present disclosure, the target base station refers to a base station for the UE to switch to, namely, the target base station refers to a base station performing data transmission with the UE after switching.

In one or more embodiments of the present disclosure, the source base station may determine the target base station of the UE in response to the measurement report of the UE.

At step 102, wireless charging information of the UE is sent to the target base station.

In one or more embodiments of the present disclosure, after the source base station determines the target base station, the source base station may send the wireless charging information of the UE to the target base station, and correspondingly the target base station may, after receiving the wireless charging information of the UE, charge the UE based on the wireless charging information. Of course, there are many wireless charging technologies and no limitation is made to the specific implementation of the wireless charging in all the embodiments of the present disclosure. For example, typical wireless charging technologies may be illustratively divided into three major categories which are an electromagnetic induction technology, an electromagnetic resonance technology and a radio frequency technology. In one possible implementation, the wireless charging in the embodiments of the present disclosure may be typically radio frequency technology, which is also called "air charge technology".

In other words, in the present disclosure, the source base station may send the wireless charging information of the UE to the target base station in response to switching of the UE such that the target base station can charge the UE based on the wireless charging information. Thus, during the switching between the base stations, the UE can be still wirelessly charged, namely, the UE being charged wirelessly can be wirelessly charged by the target base station after completing the switching between the base stations.

In the method of controlling charging of the UE in the embodiments of the present disclosure, a target base station of the UE is determined by the source base station responding to a measurement report of the UE and wireless charging information of the UE is sent to the target base station. Therefore, the UE can be still wirelessly charged during switching between the base stations, namely, the UE being charged wirelessly can continue to be wirelessly charged by the target base station after completing the switching between the base stations (switching from the source base station to the target base station).

It should be noted that the above possible implementations may be performed separately or in combination, which is not limited in the embodiments of the present disclosure.

Figure 2:
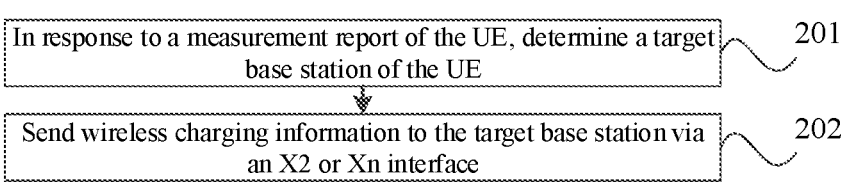
FIG. 2 is a flowchart illustrating another method of controlling charging of a UE according to one or more embodiments of the present disclosure.

One or more embodiments of the present disclosure provide another method of controlling charging of a UE. FIG. 2 is a flowchart illustrating another method of controlling charging of a UE according to one or more embodiments of the present disclosure. The method of controlling charging of the UE may be performed by a source base station. The method of controlling charging of the UE may be performed separately or performed in combination with any one of the embodiments of the present disclosure or performed in combination with one possible implementation in any one of the embodiments of the present disclosure or performed in combination with any one of the technical solutions in the related arts.

As shown in FIG. 2, the method of controlling charging of the UE may include the following steps.

At step 201, in response to a measurement report of the UE, a target base station of the UE is determined.

In one or more embodiments of the present disclosure, the step 201 can be performed by referring to any implementation of the embodiments of the present disclosure. No limitation is made hereto in the embodiments of the present disclosure and no redundant descriptions are made herein.

At step 202, wireless charging information is sent to the target base station via an X2 or Xn interface.

In one possible implementation of the embodiments of the present disclosure, the wireless charging information may include wireless charging capability information of the UE.

In another possible implementation of the embodiments of the present disclosure, the wireless charging information may include current wireless charging configuration information of the source base station for the UE, and thus, the wireless charging information may include wireless charging configuration information currently configured by the source base station for the UE.

In another possible implementation of the embodiments of the present disclosure, the wireless charging information may include recommended wireless charging configuration information of the source base station for the UE, and thus, the wireless charging information may include wireless charging configuration information recommended by the source base station for the UE.

In another possible implementation of the embodiments of the present disclosure, the wireless charging information may include charge requirement information of the UE, for example, the wireless charging information may include a charge power of the UE and the like.

In yet another possible implementation of the embodiments of the present disclosure, the wireless charging information may include charge state information of the UE, for example, the wireless charging information may include a remaining charge time length (that is, how long the UE needs to be charged further) of the UE and the like.

It should be noted that the above wireless charging information only illustratively include one piece of information, and in practical applications, the wireless charging information may further include any two of the above five pieces of information, or the wireless charging information may further include any three of the above five pieces of information, or the wireless charging information may further include any four of the above five pieces of information at the same time, or the wireless charging information may further include the above five pieces of information at the same time, which is not limited in the present disclosure.

In one or more embodiments of the present disclosure, the source base station may send the wireless charging information to the target base station via the X2 interface, or the source base station may also send the wireless charging information to the target base station via the Xn interface.

As an example, the source base station may send to the target base station a handover request (HANDOVER REQUEST) signaling containing the wireless charging information via the X2 interface or Xn interface.

In the method of controlling charging of the UE in the embodiments of the present disclosure, a target base station of the UE is determined by the source base station responding to a measurement report of the UE and wireless charging information of the UE is sent to the target base station. Therefore, the UE can be still wirelessly charged during switching between the base stations, namely, the UE being charged wirelessly can continue to be wirelessly charged by the target base station after completing the switching between the base stations (switching from the source base station to the target base station).

It should be noted that the above possible implementations may be performed separately or in combination, which is not limited in the embodiments of the present disclosure.

Figure 3:
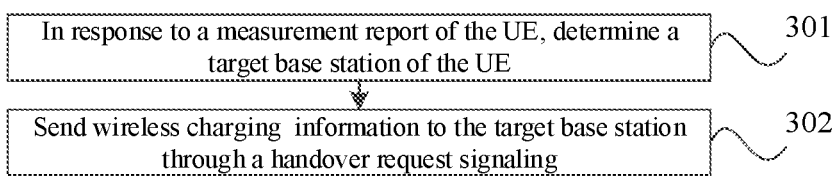
FIG. 3 is a flowchart illustrating another method of controlling charging of a UE according to one or more embodiments of the present disclosure.

One or more embodiments of the present disclosure provide another method of controlling charging of a UE. FIG. 3 is a flowchart illustrating another method of controlling charging of a UE according to one or more embodiments of the present disclosure. The method of controlling charging of the UE may be performed by a source base station. The method of controlling charging of the UE may be performed separately or performed in combination with any one of the embodiments of the present disclosure or performed in combination with one possible implementation in any one of the embodiments of the present disclosure or performed in combination with any one of the technical solutions in the related arts.

As shown in FIG. 3, the method of controlling charging of the UE may include the following steps.

At step 301, in response to a measurement report of the UE, a target base station of the UE is determined.

In one or more embodiments of the present disclosure, the step 301 can be performed by referring to any implementation of the embodiments of the present disclosure. No limitation is made hereto in the embodiments of the present disclosure and no redundant descriptions are made herein.

At step 302, wireless charging information is sent to the target base station through a handover request signaling.

It should be noted that the explanations for the wireless charging information in the preceding embodiments are also applicable to this embodiment and no redundant descriptions are made herein.

In one or more embodiments of the present disclosure, the source base station may send the wireless charging information to the target base station through a handover request (HANDOVER REQUEST) signaling.

As an example, the source base station may add a new Information Element (IE) to the handover request signaling and use the new IE to indicate the wireless charging information and then send the above handover request signaling containing the new IE to the target base station.

In the method of controlling charging of the UE in the embodiments of the present disclosure, a target base station of the UE is determined by the source base station responding to a measurement report of the UE and wireless charging information of the UE is sent to the target base station. Therefore, the UE can be still wirelessly charged during the switching between the base stations, namely, the UE being charged wirelessly can continue to be wirelessly charged by the target base station after completing the switching between the base stations (switching from the source base station to the target base station).

It should be noted that the above possible implementations may be performed separately or in combination, which is not limited in the embodiments of the present disclosure.

Figure 4:
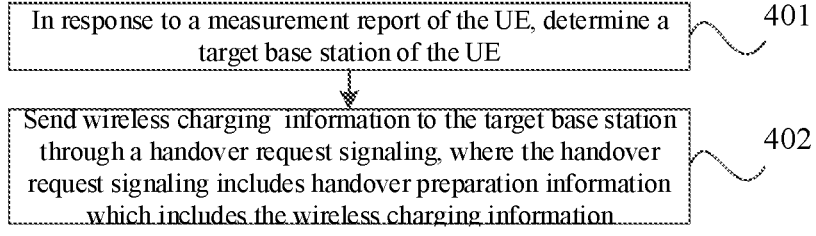
FIG. 4 is a flowchart illustrating another method of controlling charging of a UE according to one or more embodiments of the present disclosure.

One or more embodiments of the present disclosure provide another method of controlling charging of a UE. FIG. 4 is a flowchart illustrating another method of controlling charging of a UE according to one or more embodiments of the present disclosure. The method of controlling charging of the UE may be performed by a source base station. The method of controlling charging of the UE may be performed separately or performed in combination with any one of the embodiments of the present disclosure or performed in combination with one possible implementation in any one of the embodiments of the present disclosure or performed in combination with any one of the technical solutions in the related arts.

As shown in FIG. 4, the method of controlling charging of the UE may include the following steps.

At step 401, in response to a measurement report of the UE, a target base station of the UE is determined.

In one or more embodiments of the present disclosure, the step 401 can be performed by referring to any implementation of the embodiments of the present disclosure. No limitation is made hereto in the embodiments of the present disclosure and no redundant descriptions are made herein.

At step 402, wireless charging information is sent to the target base station through a handover request signaling, where the handover request signaling includes handover preparation information which includes the wireless charging information. In some embodiments, the handover preparation information is also identified by HandoverPreparationInformation.

It should be noted that the explanations for the wireless charging information in the preceding embodiments are also applicable to this embodiment and no redundant descriptions are made herein.

In one or more embodiments of the present disclosure, the source base station may send the wireless charging information to the target base station through a handover request (HANDOVER REQUEST) signaling, where the handover request signaling includes handover preparation information (HandoverPreparationInformation) which includes the wireless charging information.

As an example, the source base station may send the handover preparation information (HandoverPreparationInformation) containing the wireless charging information to the target base station.

In the method of controlling charging of the UE in the embodiments of the present disclosure, a target base station of the UE is determined by the source base station responding to a measurement report of the UE and wireless charging information of the UE is sent to the target base station. Therefore, the UE can be still wirelessly charged during the switching between the base stations, namely, the UE being charged wirelessly can continue to be wirelessly charged by the target base station after completing the switching between the base stations (switching from the source base station to the target base station).

It should be noted that the above possible implementations may be performed separately or in combination, which is not limited in the embodiments of the present disclosure.

Figure 5:
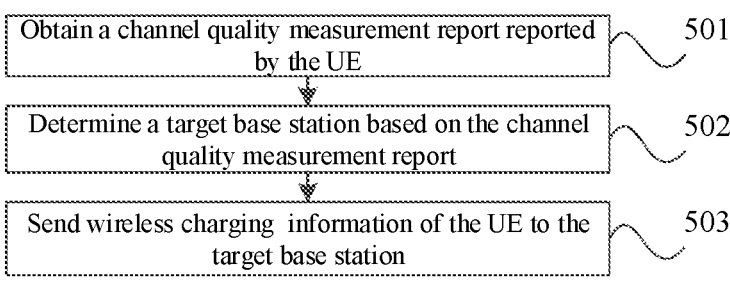
FIG. 5 is a flowchart illustrating another method of controlling charging of a UE according to one or more embodiments of the present disclosure.

One or more embodiments of the present disclosure provide another method of controlling charging of a UE. FIG. 5 is a flowchart illustrating another method of controlling charging of a UE according to one or more embodiments of the present disclosure. The method of controlling charging of the UE may be performed by a source base station. The method of controlling charging of the UE may be performed separately or performed in combination with any one of the embodiments of the present disclosure or performed in combination with one possible implementation in any one of the embodiments of the present disclosure or performed in combination with any one of the technical solutions in the related arts.

As shown in FIG. 5, the method of controlling charging of the UE may include the following steps.

At step 501, a channel quality measurement report transmitted by the UE is obtained.

In one or more embodiments of the present disclosure, the source base station may receive the channel quality measurement report transmitted by the UE being wirelessly charged.

At step 502, a target base station is determined based on the channel quality measurement report.

In one or more embodiments of the present disclosure, the source base station may determine the target base station of the UE based on the channel quality measurement report.

As an example, the source base station may determine a base station with a highest channel quality based on the channel quality measurement report and take the base station with the highest channel quality as the target base station.

For example, if the channel quality measurement report indicates a base station 1 has a highest channel quality, the source base station may take the base station 1 as the target base station.

As another example, the source base station may determine candidate base stations with the channel quality higher than the channel quality of the source base station and select one base station from the candidate base stations as the target base station.

For example, assuming the channel quality measurement report indicates a base station 1 and a base station 2 have a channel quality higher than the channel quality of the source base station, the base station 1 and the base station 2 can be taken as candidate base stations, and then one base station may be selected from the candidate base stations as the target base station. For example, the base station 1 may be taken as the target base station or the base station 2 may be taken as the target base station.

At step 503, wireless charging information of the UE is sent to the target base station.

In one or more embodiments of the present disclosure, the step 503 can be performed by referring to any implementation of the embodiments of the present disclosure. No limitation is made hereto in the embodiments of the present disclosure and no redundant descriptions are made herein.

In the method of controlling charging of the UE in the embodiments of the present disclosure, a target base station of the UE is determined by the source base station responding to a measurement report of the UE and wireless charging information of the UE is sent to the target base station. Therefore, the UE can be still wirelessly charged during the switching between the base stations, namely, the UE being charged wirelessly can continue to be wirelessly charged by the target base station after completing the switching between the base stations (switching from the source base station to the target base station).

It should be noted that the above possible implementations may be performed separately or in combination, which is not limited in the embodiments of the present disclosure.

Figure 6:
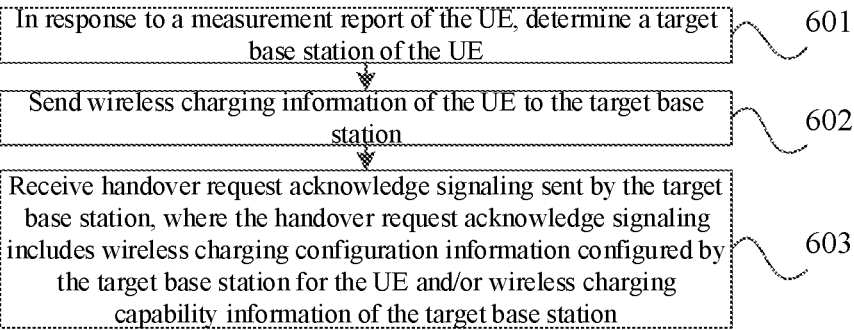
FIG. 6 is a flowchart illustrating another method of controlling charging of a UE according to one or more embodiments of the present disclosure.

One or more embodiments of the present disclosure provide another method of controlling charging of a UE. FIG. 6 is a flowchart illustrating another method of controlling charging of a UE according to one or more embodiments of the present disclosure. The method of controlling charging of the UE may be performed by a source base station. The method of controlling charging of the UE may be performed separately or performed in combination with any one of the embodiments of the present disclosure or performed in combination with one possible implementation in any one of the embodiments of the present disclosure or performed in combination with any one of the technical solutions in the related arts.

As shown in FIG. 6, the method of controlling charging of the UE may include the following steps.

At step 601, in response to a measurement report of the UE, a target base station of the UE is determined.

At step 602, wireless charging information of the UE is sent to the target base station.

In one or more embodiments of the present disclosure, the step 601 and step 602 can be performed respectively by referring to any implementation of the embodiments of the present disclosure. No limitation is made hereto in the embodiments of the present disclosure and no redundant descriptions are made herein.

At step 603, a handover request acknowledge signaling sent by the target base station is received, where the handover request acknowledge signaling includes wireless charging configuration information configured by the target base station for the UE and/or wireless charging capability information of the target base station.

In one or more embodiments of the present disclosure, the wireless charging capability information of the target base station may include whether the target base station has wireless charging capability, namely, whether the target base station supports wireless charging. In the case where the wireless charging capability information of the target base station indicates the target base station does not support wireless charging, the wireless charging capability information of the target base station further includes whether the target base station supports switching of the UE.

In one possible implementation of the embodiments of the present disclosure, after the target base station receives the wireless charging information sent by the source base station, if the target base station has wireless charging capability, that is, if the target base station supports wireless charging, the target base station may, based on its own situations, perform wireless charging configuration for the UE and send a handover request acknowledge (HANDOVER REQUEST ACKNOWLEDGE) signaling to the source base station, where the handover request acknowledge signaling includes the wireless charging configuration information configured by the target base station for the UE.

In another possible implementation of the embodiments of the present disclosure, in the case where the target base station supports wireless charging, the handover request acknowledge (HANDOVER REQUEST ACKNOWLEDGE) signaling sent by the target base station to the source base station may include the wireless charging capability information of the target base station, for example, the handover request acknowledge signaling may indicate the target base station supports wireless charging.

In another possible implementation of the embodiments of the present disclosure, when the target base station supports wireless charging, the handover request acknowledge (HANDOVER REQUEST ACKNOWLEDGE) signaling sent by the target base station to the source base station may include the wireless charging configuration information configured by the target base station for the UE and the wireless charging capability information of the target base station (for example, the target base station supports wireless charging).

In another possible implementation of the embodiments of the present disclosure, in the case where the target base station does not support wireless charging, the handover request acknowledge (HANDOVER REQUEST ACKNOWLEDGE) signaling sent by the target base station to the source base station may include the wireless charging capability information of the target base station, for example, the handover request acknowledge signaling indicates the target base station does not support wireless charging but supports UE switching.

Figure 7:
FIG. 7 is a schematic diagram 1 illustrating interaction flow between a source base station and a target base station according to one or more embodiments of the present disclosure.

As an example, illustrative descriptions are made with Next Generation Radio Access Network node (NG-RAN node) as the base station. As shown in FIG. 7, the source base station (i.e. source NG-RAN node) may, after determining the target base station (i.e. target NG-RAN node), send the wireless charging information to the target base station through a HANDOVER REQUEST signaling. After receiving the wireless charging information, the target base station may notify, through the HANDOVER REQUEST ACKNOWLEDGE signaling, the source base station of the wireless charging configuration information that the target base station configures for the UE or notify the source base station that the target base station does not support wireless charging of the UE but supports UE switching.

Optionally, in one possible implementation of the embodiments of the present disclosure, when the source base station determines based on the handover request acknowledge signaling that the wireless charging capability information of the target base station indicates not supporting wireless charging but supporting UE switching, in order to perform wireless charging for the UE, the source base station may re-determine a new target base station of the UE based on the channel quality measurement report transmitted by the UE. In this way, the success rate of the wireless charging of the UE can be increased.

In the method of controlling charging of the UE in the embodiments of the present disclosure, a target base station of the UE is determined by the source base station responding to a measurement report of the UE and wireless charging information of the UE is sent to the target base station. Therefore, the UE can be still wirelessly charged during the switching between the base stations, namely, the UE being charged wirelessly can continue to be wirelessly charged by the target base station after completing the switching between the base stations (switching from the source base station to the target base station).

It should be noted that the above possible implementations may be performed separately or in combination, which is not limited in the embodiments of the present disclosure.

One or more embodiments of the present disclosure provide another method of controlling charging of a UE. FIG. 8 is a flowchart illustrating another method of controlling charging of a UE according to one or more embodiments of the present disclosure. The method of controlling charging of the UE may be performed by a source base station. The method of controlling charging of the UE may be performed separately or performed in combination with any one of the embodiments of the present disclosure or performed in combination with one possible implementation in any one of the embodiments of the present disclosure or performed in combination with any one of the technical solutions in the related arts.

As shown in FIG. 8, the method of controlling charging of the UE may include the following steps.

At step 701, in response to a measurement report of the UE, a target base station of the UE is determined.

At step 702, wireless charging information of the UE is sent to the target base station.

In one or more embodiments of the present disclosure, the step 701 and step 702 can be performed respectively by referring to any implementation of the embodiments of the present disclosure. No limitation is made hereto in the embodiments of the present disclosure and no redundant descriptions are made herein.

At step 703, a handover preparation failure signaling sent by the target base station is received.

In one or more embodiments of the present disclosure, in the case where the target base station does not support UE switching, the target base station may send a handover preparation failure signaling to the source base station, where the handover preparation failure signaling may be used to indicate the target base station does not support UE switching (i.e. the target base station rejects the UE switching).

Optionally, if the target base station does not support UE switching, that is, if the target base station rejects UE switching, the handover preparation failure signaling may also be used to indicate a rejection cause of the target base station, for example, indicate the target base station does not support wireless charging for the UE.

As an example, illustrative descriptions are made with NG-RAN node as the base station. As shown in FIG. 9, the source base station (i.e. source NG-RAN node) may, after determining the target base station (i.e. target NG-RAN node), send the wireless charging information to the target base station through a handover request signaling. After receiving the wireless charging information, the target base station may notify, through a handover request failure signaling, the source base station that the target base station rejects UE switching, and notify the source base station that the rejection cause of the target base station indicates not supporting wireless charging for the UE.

At step 704, based on the channel quality measurement report, a new target base station of the UE is determined.

In one or more embodiments of the present disclosure, after receiving the handover preparation failure signaling sent by the target base station, the source base station may re-determine a new target base station of the UE based on the channel quality measurement report transmitted by the UE. Then, the source base station may send the wireless charging information of the UE to the new target base station, and the new target base station determines, based on its own situations, whether to accept UE switching and whether to perform wireless charging for the UE. Thus, the success rate of the wireless charging for the UE can be increased.

In the method of controlling charging of the UE in the embodiments of the present disclosure, a target base station of the UE is determined by the source base station responding to a measurement report of the UE and wireless charging information of the UE is sent to the target base station. Therefore, the UE can be still wirelessly charged during the switching between the base stations, namely, the UE being charged wirelessly can continue to be wirelessly charged by the target base station after completing the switching between the base stations (switching from the source base station to the target base station).

It should be noted that the above possible implementations may be performed separately or in combination, which is not limited in the embodiments of the present disclosure.

One or more embodiments of the present disclosure provide another method of controlling charging of a UE. FIG. 10 is a flowchart illustrating another method of controlling charging of a UE according to one or more embodiments of the present disclosure. The method of controlling charging of the UE may be performed by a target base station.

As shown in FIG. 10, the method of controlling charging of the UE may include the following steps.

At step 801, wireless charging information of the UE is received.

In one or more embodiments of the present disclosure, a source base station may determine a target base station of the UE in response to a measurement report of the UE, and send wireless charging information of the UE to the target base station. Correspondingly, the target base station may receive the wireless charging information.

It should be noted that the explanations for the method of controlling charging of the UE executed at the source base station side in any embodiment shown in FIGS. 1 to 8 are also applicable to the method of controlling charging of the UE executed at the target base station side in this embodiment. Their implementation principles are similar and thus no redundant descriptions are made herein.

At step 802, the UE is charged based on the wireless charging information.

In one or more embodiments of the present disclosure, in the case where the target base station supports wireless charging, the target base station may charge the UE based on the wireless charging information.

In the method of controlling charging of the UE in the embodiments of the present disclosure, after receiving the wireless charging information of the UE, the target base station charges the UE based on the wireless charging information. Thus, the UE can be still wirelessly charged during the switching between the base stations, namely, the UE being charged wirelessly can continue to be wirelessly charged by the target base station after completing the switching between the base stations (switching from the source base station to the target base station).

One or more embodiments of the present disclosure provide another method of controlling charging of a UE. FIG. 11 is a flowchart illustrating another method of controlling charging of a UE according to one or more embodiments of the present disclosure. The method of controlling charging of the UE may be performed by a target base station. The method of controlling charging of the UE may be performed separately or performed in combination with any one of the embodiments or performed in combination with one possible implementation in any one of the embodiments of the present disclosure or performed in combination with any one of the technical solutions in the related arts.

As shown in FIG. 11, the method of controlling charging of the UE may include the following steps.

At step 901, wireless charging information of the UE is received.

At step 902, the UE is charged based on the wireless charging information.

In one or more embodiments of the present disclosure, the step 901 and step 902 can be performed respectively by referring to any implementation of the embodiments of the present disclosure. No limitation is made hereto in the embodiments of the present disclosure and no redundant descriptions are made herein.

At step 903, wireless charging configuration information is sent to the UE.

In one or more embodiments of the present disclosure, the target base station may, after the UE completes switching, send wireless charging configuration information to the UE.

In one possible implementation of the embodiments of the present disclosure, the target base station may send the wireless charging configuration information to the UE via a Radio Resource Control (RRC) reconfiguration signaling (RRCReconfiguration signaling).

In another possible implementation of the embodiments of the present disclosure, the target base station may send the wireless charging configuration information to the UE via a RRC connection reconfiguration signaling (i.e. RRCConnectionReconfiguration signaling).

In the method of controlling charging of the UE in the embodiments of the present disclosure, after receiving the wireless charging information of the UE, the target base station charges the UE based on the wireless charging information. Thus, the UE can be still wirelessly charged during the switching between the base stations, namely, the UE being charged wirelessly can continue to be wirelessly charged by the target base station after completing the switching between the base stations (switching from the source base station to the target base station).

It should be noted that the above possible implementations may be performed separately or in combination, which is not limited in the embodiments of the present disclosure.

Corresponding to the method of controlling charging of the UE provided by the embodiments in FIGS. 1 to 8, the present disclosure further provides an apparatus of controlling charging of a UE. Since the apparatus of controlling charging of the UE provided by this embodiment of the present disclosure corresponds to the method of controlling charging of the UE provided by the embodiments in FIGS. 1 to 8, the implementations of the method of controlling charging of the UE are also applicable to the apparatus of controlling charging of the UE in this embodiment of the present disclosure, and no redundant descriptions are made herein.

Figure 12:
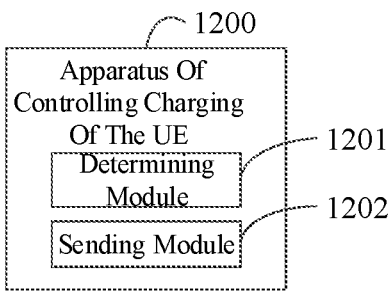
FIG. 12 is a structural schematic diagram illustrating an apparatus of controlling charging of a UE according to one or more embodiments of the present disclosure.

FIG. 12 is a structural schematic diagram illustrating an apparatus of controlling charging of a UE according to one or more embodiments of the present disclosure. The apparatus may be applied to a source base station.

As shown in FIG. 12, the apparatus 1200 of controlling charging of the UE may include a determining module 1201 and a sending module 1202, where, the determining module 1201 is configured to, in response to a measurement report of the UE, determine a target base station of the UE;

the sending module 1202 is configured to send wireless charging information of the UE to the target base station.

Optionally, the sending module 1202 is specifically configured to send the wireless charging information to the target base station via the X2 or Xn interface.

Optionally, the sending module 1202 is specifically configured to send the wireless charging information to the target base station through a handover request signaling.

Optionally, the handover request signaling includes handover preparation information, wherein the handover preparation information includes the wireless charging information.

Optionally, the wireless charging information includes at least one of: wireless charging capability information of the UE; current wireless charging configuration information of the source base station for the UE; recommended wireless charging configuration information of the source base station for the UE; charge requirement information of the UE; charge state information of the UE.

Optionally, the determining module 1201 is specifically configured to: obtain a channel quality measurement report transmitted by the UE; based on the channel quality measurement report, determine the target base station.

Optionally, the apparatus 1200 of controlling charging of the UE may further include:

a first receiving module, configured to receive a handover request acknowledge signaling sent by the target base station, where the handover request acknowledge signaling includes wireless charging configuration information of the target base station for the UE and/or wireless charging capability information of the target base station.

Optionally, if the wireless charging capability information of the target base station indicates not supporting wireless charging but supporting switching of the UE, the determining module 1201 is further configured to determine a new target base station of the UE based on the channel quality measurement report.

Optionally, the apparatus 1200 of controlling charging of the UE may further include:

a second receiving module, configured to receive a handover preparation failure signaling sent by the target base station.

The determining module 1201 is further configured to determine a new target base station of the UE based on the channel quality measurement report.

In the apparatus of controlling charging of the UE in the embodiments of the present disclosure, a target base station of the UE is determined by the source base station responding to a measurement report of the UE and wireless charging information of the UE is sent to the target base station. Therefore, the UE can be still wirelessly charged during base station switching, namely, the UE being charged wirelessly can continue to be wirelessly charged by the target base station after completing base station switching (switching from the source base station to the target base station).

Corresponding to the method of controlling charging of the UE provided by the embodiments in FIGS. 10 to 11, the present disclosure further provides an apparatus of controlling charging of a UE. Since the apparatus of controlling charging of the UE in this embodiment of the present disclosure corresponds to the method of controlling charging of the UE provided by the embodiments in FIGS. 10 to 11, the implementations of the method of controlling charging of the UE are also applicable to the apparatus of controlling charging of the UE in this embodiment of the present disclosure, and no redundant descriptions are made herein.

Figure 13:
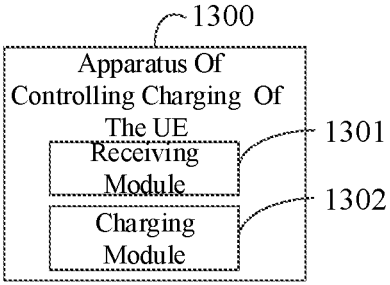
FIG. 13 is a structural schematic diagram illustrating another apparatus of controlling charging of a UE according to one or more embodiments of the present disclosure.

FIG. 13 is a structural schematic diagram illustrating another apparatus of controlling charging of a UE according to one or more embodiments of the present disclosure. The apparatus may be applied to a target base station.

As shown in FIG. 13, the apparatus 1300 of controlling charging of the UE may include a receiving module 1301 and a charging module 1302, where, the receiving module 1301 is configured to receive wireless charging information of the UE;

the charging module 1302 is configured to charge the UE based on the wireless charging information.

Optionally, the apparatus 1300 of controlling charging of the UE may further include:

a sending module, configured to send wireless charging configuration information to the UE.

Optionally, the sending module is specifically configured to send the wireless charging configuration information to the UE via a radio resource control (RRC) reconfiguration signaling.

Optionally, the sending module is specifically configured to send the wireless charging configuration information to the UE via a RRC connection reconfiguration signaling.

In the apparatus of controlling charging of the UE in the embodiments of the present disclosure, by receiving the wireless charging information of the UE, the target base station charges the UE based on the wireless charging information. Thus, the UE can be still wirelessly charged during base station switching, namely, the UE being charged wirelessly can continue to be wirelessly charged by the target base station after completing base station switching (switching from the source base station to the target base station).

In order to implement the above embodiments, the present disclosure further provides a communication device.

The communication device provided by the embodiments of the present disclosure includes a processor, a transceiver, a memory and executable programs stored in the memory and executable by the processor, where the processor runs the executable programs to perform the above methods.

The communication device may be the above source base station or target base station.

The processor may include various types of storage mediums which are non-transitory computer storage mediums capable of continuing storing information thereon after the communication device is powered off. Herein, the communication device includes the source base station or the target base station.

The process may be connected to the memory via a bus to read executable programs in the memory, for example, at least one of those shown in FIGS. 1 to 7.

In order to implement the above embodiments, the present disclosure further provides a computer storage medium.

The computer storage medium provided by the embodiments of the present disclosure stores executable programs. After the executable programs are executed by a processor, the above methods can be implemented, for example, at least one of those shown in FIGS. 1 to 11.

Figure 14:
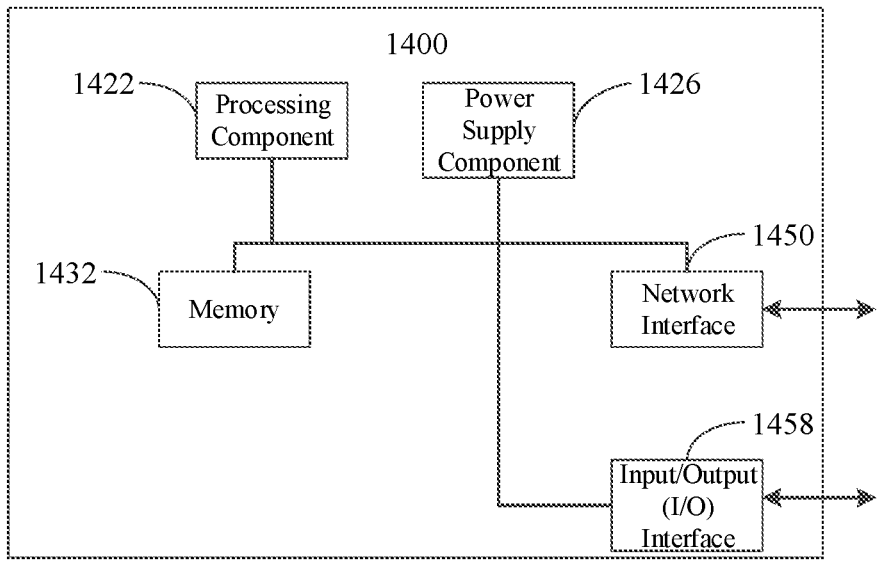
FIG. 14 is a structural schematic diagram illustrating a base station according to one or more embodiments of the present disclosure.

As shown in FIG. 14, it is a structural schematic diagram illustrating a base station according to one or more embodiments of the present disclosure. The base station may be the source base station or the target base station in the above embodiments. Referring to FIG. 14, the base station 1400 includes a processing component 1422 which further includes at least one processor and memory resources represented by a memory 1432 for storing instructions executable by the processing component 1422, for example, application programs. The application programs stored in the memory 1432 may include one or more modules with each corresponding to one set of instructions. Furthermore, the processing component 1422 is configured to execute the instructions to execute any one of the above methods performed by the base station, for example, the method of controlling charging of the UE shown in any one of FIGS. 1 to 11.

The base station 1400 further includes one power supply component 1426 configured to execute power management for the base station 1400, one wired or wireless network interface 1450 configured to connect the base station 1400 to a network, and one input/output (I/O) interface 1458. The base station 1400 may be operated based on an operating system stored in the memory 1432, such as Windows Server™, Mac OS X™, Unix™, Linux™ and FreeBSD™ and the like.

In some examples, there is provided a method of controlling charging of a User Equipment (UE), wherein the method is performed by a source base station, and comprises: in response to a measurement report of the UE, determining a target base station of the UE; sending wireless charging information of the UE to the target base station.

Optionally, sending the wireless charging information of the UE to the target base station includes: sending the wireless charging information to the target base station via an X2 or Xn interface.

Optionally, sending the wireless charging information of the UE to the target base station includes: sending the wireless charging information to the target base station by a handover request signaling.

Optionally, the handover request signaling includes handover preparation information, and the handover preparation information includes the wireless charging information.

Optionally, the wireless charging information includes at least one of: wireless charging capability information of the UE; current wireless charging configuration information of the source base station for the UE; recommended wireless charging configuration information of the source base station for the UE; charge requirement information of the UE; charge state information of the UE.

Optionally, in response to the measurement report of the UE, determining the target base station of the UE includes: obtaining a channel quality measurement report transmitted by the UE; based on the channel quality measurement report, determining the target base station.

Optionally, the method further includes: receiving a handover request acknowledge signaling sent by the target base station, where, the handover request acknowledge signaling includes wireless charging configuration information of the target base station for the UE and/or wireless charging capability information of the target base station.

Optionally, if the wireless charging capability information of the target base station indicates not supporting wireless charging but supporting switching of the UE, the method further includes: based on the channel quality measurement report, determining a new target base station of the UE.

Optionally, the method further includes: receiving a handover preparation failure signaling sent by the target base station; based on the channel quality measurement report, determining a new target base station of the UE.

In some examples, there is provided another method of controlling charging of a UE, which is performed by a target base station and includes: receiving wireless charging information of the UE; based on the wireless charging information, charging the UE.

Optionally, the method further includes: sending wireless charging configuration information to the UE.

Optionally, sending the wireless charging configuration information to the UE includes: by a radio resource control (RRC) reconfiguration signaling, sending the wireless charging configuration information to the UE.

Optionally, sending the wireless charging configuration information to the UE includes: by an RRC connection reconfiguration signaling, sending the wireless charging configuration information to the UE.

In some examples, there is provided an apparatus of controlling charging of a UE, which is applied to a source base station and includes: a determining module, configured to, in response to a measurement report of the UE, determine a target base station of the UE; a sending module, configured to send wireless charging information of the UE to the target base station.

In some examples, there is provided another apparatus of controlling charging of a UE, which is applied to a target base station and includes: a receiving module, configured to receive wireless charging information of the UE; a charging module, configured to charge the UE based on the wireless charging information.

In some examples, there is provided a communication device, including a transceiver, a memory and a processor which is connected to the transceiver and the memory, respectively, and configured to execute computer executable instructions in the memory to control wireless signal reception and transmission of the transceiver, so as to perform the method of controlling charging of the UE mentioned in the first aspect of embodiments of the present disclosure, or the method of controlling charging of the UE mentioned in the second aspect of embodiments of the present disclosure.

In some examples, there is provided a computer storage medium storing computer executable instructions, where the computer executable instructions are executed by a processor to perform the method of controlling charging of the UE mentioned in the first aspect of embodiments of the present disclosure, or the method of controlling charging of the UE mentioned in the second aspect of embodiments of the present disclosure.

In some examples, there is provided a computer program product, including computer programs, where the computer programs are executed by a processor to perform the method of controlling charging of the UE mentioned in the first aspect of embodiments of the present disclosure, or the method of controlling charging of the UE mentioned in the second aspect of embodiments of the present disclosure.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A method of controlling charging of a User Equipment (UE), comprising:

in response to a measurement report of the UE, determining, by a source base station, a target base station of the UE, wherein determining the target base station of the UE comprises: obtaining, by the source base station, a channel quality measurement report transmitted by the UE, and based on the channel quality measurement report, determining, by the source base station, the target base station;

sending, by the source base station, wireless charging information of the UE to the target base station, wherein sending the wireless charging information of the UE comprises: sending, by the source base station, the wireless charging information to the target base station by a handover request signaling; and receiving, by the source base station, a handover request acknowledge signaling from the target base station, wherein the handover request acknowledge signaling comprises at least one of wireless charging configuration information of the target base station for the UE or wireless charging capability information of the target base station.

2. The method according to claim 1, wherein sending the wireless charging information of the UE to the target base station comprises:

sending, by the source base station, the wireless charging information to the target base station via an X2 interface or an Xn interface.

3. The method according to claim 1, wherein the handover request signaling comprises handover preparation information, and the handover preparation information comprises the wireless charging information.

4. The method according to claim 1, wherein the wireless charging information comprises at least one of the following information:

wireless charging capability information of the UE;

current wireless charging configuration information of the source base station for the UE;

recommended wireless charging configuration information of the source base station for the UE;

charging requirement information of the UE; or charging state information of the UE.

5. The method according to claim 1, wherein in response to determining that the wireless charging capability information of the target base station indicates not supporting wireless charging but supporting switching of the UE, the method further comprises:

based on the channel quality measurement report, determining, by the source base station, a new target base station of the UE.

6. The method according to claim 1, further comprising:

receiving, by the source base station, a handover preparation failure signaling from the target base station; and based on the channel quality measurement report, determining, by the source base station, a new target base station of the UE.

7. A method of controlling charging of a User Equipment (UE), comprising:

receiving, by a target base station, wireless charging information of the UE, wherein receiving the wireless charging information comprises: receiving, by the target base station, the wireless charging information of the UE from a source base station by a handover request signaling;

sending, by the target base station, a handover request acknowledge signaling to the source base station, wherein the handover request acknowledge signaling comprises at least one of wireless charging configuration information of the target base station for the UE or wireless charging capability information of the target base station; and based on the wireless charging information, charging the UE by the target base station.

8. The method according to claim 7, further comprising:

sending, by the target base station, wireless charging configuration information to the UE.

9. The method according to claim 8, wherein sending the wireless charging configuration information to the UE comprises:

by a radio resource control (RRC) reconfiguration signaling, sending, by the target base station, the wireless charging configuration information to the UE.

10. The method according to claim 8, wherein sending the wireless charging configuration information to the UE comprises:

by a radio resource control (RRC) connection reconfiguration signaling, sending, by the target base station, the wireless charging configuration information to the UE.

11. A communication device, comprising:

a transceiver;

a memory; and a processor, connected to the transceiver and the memory, respectively, wherein the processor is configured to control wireless signal reception and transmission of the transceiver by executing computer executable instructions stored in the memory and perform operations comprising:

in response to a measurement report of a User Equipment (UE), determining a target base station of the UE, wherein determining the target base station of the UE comprise: obtaining a channel quality measurement report transmitted by the UE, and based on the channel quality measurement report, determining the target base station;

sending wireless charging information of the UE to the target base station, wherein sending the wireless charging information of the UE comprises: sending the wireless charging information to the target base station by a handover request signaling; and receiving a handover request acknowledge signaling from the target base station, wherein the handover request acknowledge signaling comprises at least one of wireless charging configuration information of the target base station for the UE or wireless charging capability information of the target base station.

12. The communication device according to claim 11, wherein sending the wireless charging information of the UE to the target base station comprises:

sending the wireless charging information to the target base station via an X2 interface or an Xn interface.

13. The communication device according to claim 11, wherein the handover request signaling comprises handover preparation information, and the handover preparation information comprises the wireless charging information.

14. The communication device according to claim 11, wherein the wireless charging information comprises at least one of the following information:

wireless charging capability information of the UE;

current wireless charging configuration information of the source base station for the UE;

recommended wireless charging configuration information of the source base station for the UE;

charging requirement information of the UE; or charging state information of the UE.

* * * * *